(12) United States Patent
Aswani et al.

(10) Patent No.: US 12,682,161 B1
(45) Date of Patent: Jul. 14, 2026

(54) ENHANCED PROMPT REASONING AT APPLICATION LAYER FOR MACHINE LEARNING MODELS

(71) Applicant: Amazon Technologies, Inc., Seattle, WA (US)

(72) Inventors: Krishna Aswani, Santa Clara, CA (US); Huilin Lu, Seattle, WA (US); Pranav Shirish Patankar, Seattle, WA (US); Xue Tan, Santa Clara, CA (US); Priya Dhalwani, Seattle, WA (US); Jayant Ganeshmohan, Seattle, WA (US); Simon Paul Lacasse, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

(21) Appl. No.: 18/816,843

(22) Filed: Aug. 27, 2024

(51) Int. Cl.
  *G06F 40/20* (2020.01)
(52) U.S. Cl.
  CPC ................................... *G06F 40/20* (2020.01)
(58) Field of Classification Search
  CPC ....................................................... G06F 40/20

USPC .............................................................. 704/9
See application file for complete search history.

(56) References Cited

U.S. PATENT DOCUMENTS

| | | | | |
|---|---|---|---|---|
| 2024/0104391 | A1* | 3/2024 | Higgins | .............. G06F 16/3329 |
| 2024/0386215 | A1* | 11/2024 | Eisenschlos | ............ G06F 40/40 |
| 2024/0419905 | A1* | 12/2024 | Mai | ........................ G06N 20/00 |
| 2025/0378283 | A1* | 12/2025 | Krishnamani | .......... G06F 40/58 |

* cited by examiner

*Primary Examiner* — Yulin Sun
(74) *Attorney, Agent, or Firm* — Eversheds Sutherland (US) LLP

(57) ABSTRACT

Devices, systems, and methods for language model prompt engineering include a method of: providing, by at least one first processor, to a language model, a first prompt including a first task and instructing the language model to generate a set of task-specific reasoning modules; generating, by the language model, the set of task-specific reasoning modules based on the first prompt, the set of task-specific reasoning modules including a first reasoning module; providing, by at least one second processor, to the language model, a second prompt including the first task, a second task, and the first reasoning module, wherein the second prompt instructs the language model to generate an initial reasoning structure defining how to respond to the first task without providing a response; and generating, by the language model, the initial reasoning structure based on the second prompt.

20 Claims, 7 Drawing Sheets

700

702 — HARDWARE PROCESSOR
724 — INSTRUCTIONS

704 — MAIN MEMORY
724 — INSTRUCTIONS

706 — STATIC MEMORY
724 — INSTRUCTIONS

720 — NETWORK INTERFACE

730 — ANTENNA(S)

GRAPHICS DISPLAY DEVICE — 710

INPUT DEVICE — 712

UI NAVIGATION DEVICE — 714

STORAGE DEVICE — 716
MACHINE-READABLE MEDIUM — 722
INSTRUCTIONS — 724

SIGNAL GENERATION DEVICE — 718

PROMPT MODULES — 719

708

POWER DEVICE — 732

OUTPUT CONTROLLER — 734

726 — COMMUNICATIONS NETWORK

ENHANCED PROMPT REASONING AT APPLICATION LAYER FOR MACHINE LEARNING MODELS

BACKGROUND

Large language models (LLMs) have shown significant potential in understanding, generating, and reasoning in various Natural Language Processing (NLP) tasks. However, LLMs face challenges in solving multi-step reasoning tasks. Increasing model size alone is inadequate for solving LLM reasoning challenges.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
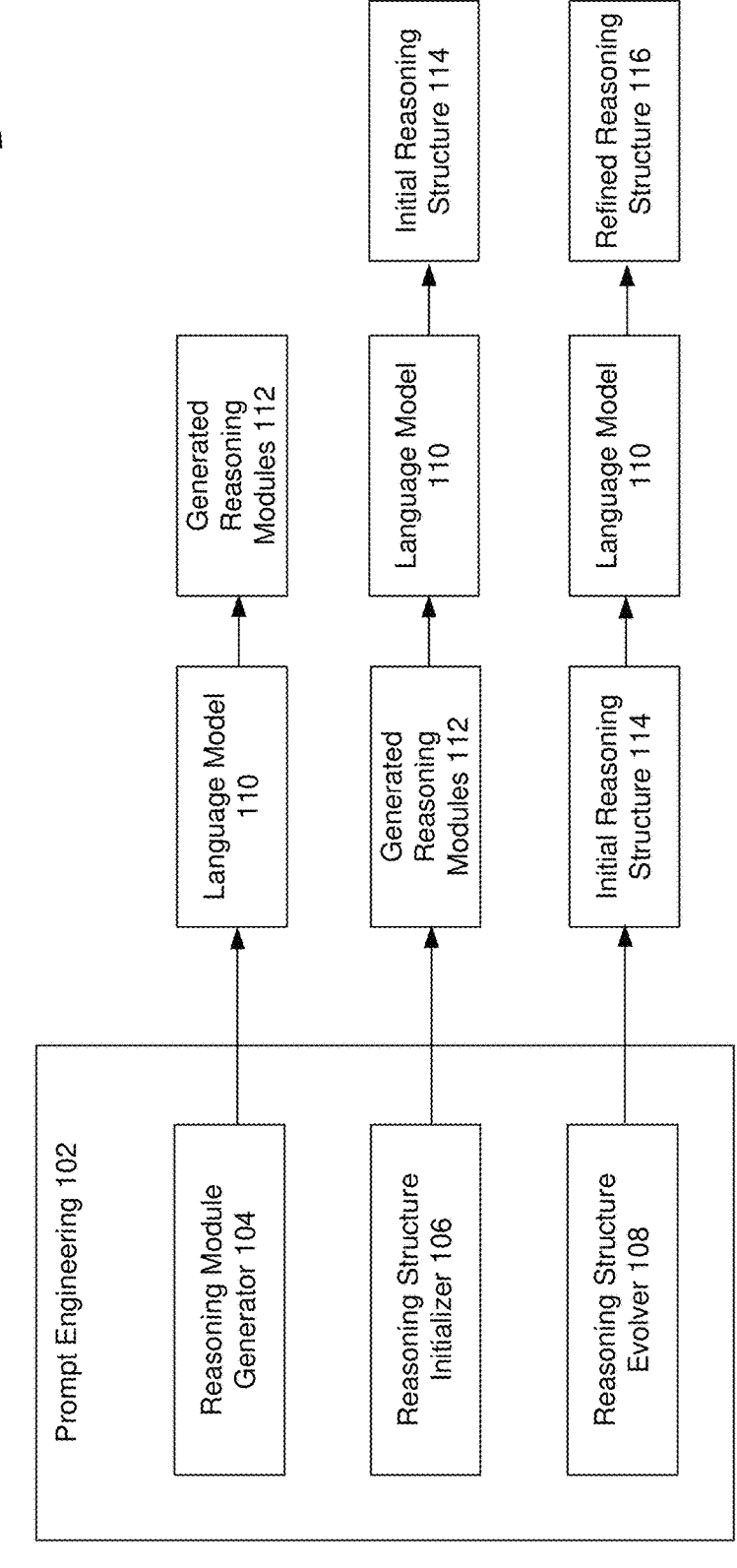
FIG. 1 is an example block diagram showing enhanced large language model (LLM) prompt engineering, in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for enhancing large language model (LLM) performance via self-reasoning.

Technical advantages of the present disclosure include improving the self-reasoning performance of LLMs by enhancing their prompts. In this manner, the present disclosure addresses technical challenges of machine learning-LLMs in particular—by using enhanced prompt engineering. As a result, testing of the enhanced techniques herein in comparison to existing LLM prompt engineering techniques has revealed improvements to LLM accuracy and logical deductions, for example. In addition, the enhanced techniques herein significantly reduce the number of inference calls needed to an LLM for large datasets.

In addition to improving model accuracy and reasoning, the enhanced prompting herein significantly reduces the number of inferencing calls to an LLM. For example, a dataset with 250 rows requires the following number of inferencing calls using the following prompting techniques: the enhanced prompting herein requires fewer than seven calls for initial reasoning structure and iterative refinement plus 250 instances=~257 calls. Direct Prompting: 250 calls, CoT: 250 calls, Self-Discover: 3 calls (first part meta prompt)+250 instances=253 calls, CoT +Self-Consistency: sample 10 times, 10250 instances=2500 calls, RM majority voting: 40250 instances=10,000 calls.

LLMs are artificial intelligence (AI) systems capable of understanding and outputting human language by processing large amounts of data and performing Natural Language Processing (NLP) tasks. LLMs include a deep learning architecture referred to as a transformer, which includes multiple layers of self-attention mechanisms that allow the LLM to determine the importance of and relationships between different words or tokens in a sequence.

Machine learning models, including LLMs, use prompt engineering to improve model output by inputting the right instructions and related data. Some prompt engineering techniques, such as Chain-of-Thought (CoT—in which a model is prompted to generate a step-by-step explanation or reasoning prior to determining a final response) and Self-Discover (asking a model to select which reasoning is most applicable to answering the question) have improved LLM reasoning abilities. However, existing LLM prompt engineering techniques rely on a single or fixed set of static seed reasoning modules such as, "think step by step," or "break down this problem," intended to simulate a human approach to problem solving. Constraining models to a set of reasoning modules limits the approaches to tackling a problem. LLMs continue to face challenges in solving multi-step reasoning tasks, and increasing model size alone is not a sufficient solution to improving LLM reasoning capabilities.

In one or more embodiments, the enhanced techniques herein improve on the strengths of previous prompting approaches while addressing their limitations. The enhanced LLM prompting approaches herein create custom reasoning modules on-the-fly for a given task, allowing LLMs to develop a wider range of reasoning structures better suited to handle specific needs of any LLM task (e.g., as opposed to the LLM having to select from a finite list of pre-set reasoning options). The enhanced techniques herein also include an iterative refinement process that allows LLMs to fine-tune their reasoning structures based on the specific requirements of respective tasks, which significantly boosts LLM reasoning performance.

In one or more embodiments, the enhanced prompting techniques herein include a reasoning module generator, a reasoning structure initializer, and a reasoning structure evolver. The reasoning module generator may dynamically create relevant reasoning modules for a given task. The reasoning structure initializer may compose an initial reasoning plan using the reasoning modules. The reasoning structure evolver may iteratively refine and improve the reasoning plan over multiple processing steps.

The techniques herein have been tested and improve LLM reasoning performance by 6.7% compared to Self-Discover and by 10.4% over CoT for a dataset with 23 diverse reasoning tasks across multiple categories. By combining dynamic prompt engineering and iterative refinement, the enhanced techniques herein provide improved flexibility and adaptability for LLM reasoning, along with improved ability of LLMs to perform complex tasks.

In one or more embodiments, the enhanced prompting herein relies on at least the following principles. The first is higher interpretability associated with a JavaScript Object Notation (JSON) structure: LLM reasoning capabilities and performance are enhanced by JSON structure's higher interoperability. The second is that LLMs have inbuilt diverse reasoning abilities: LLMs possess an inherent grasp of diverse thinking styles and essential reasoning modules crucial for performing a variety of tasks because LLMs are trained on large datasets (e.g., petabytes worth or data). Self-Discover overlooks the second principle. Instead of leveraging hidden knowledge within LLMs, Self-Discover supplies LLMs with a fixed set of initial human-designed reasoning modules. The enhanced prompting herein advocates for LLMs' intrinsic ability to independently discern and utilize relevant reasoning strategies for different tasks.

In one or more embodiments, the enhanced prompting herein includes at least two stages. One stage dynamically generates intrinsic task-related reasoning modules and structure (e.g., JSON instructions) by leveraging task examples and meta-prompts, thereby guiding LLMs to solve tasks without needing to provide a static seed module list. This stage operates at a task-level, meaning one run for each task category. Another stage uses the finalized reasoning structure produced as an output to the above-mentioned stage to solve individual task instances by asking the model to follow the instruction step-by-step.

In one or more embodiments, the reasoning module generator dynamically creates task-specific reasoning modules and descriptions. Unlike Self-Discover, the reasoning module generator does not rely on a predetermined set of static reasoning modules, but rather embraces adaptability and responsiveness by creating modules dynamically. Given only a few task examples without labels, $t_i \in T$, the reasoning module generator first creates a set of task-specific reasoning modules $\mathcal{R}$ by using a model $\mathcal{M}$ and a meta-prompt $\mathcal{P}_G$: $\mathcal{R} = \mathcal{M}(\mathcal{P}_G \| t_i)$.

By assessing the unique attributes and demands of each task, the reasoning module generator orchestrates the creation of a task-specific set of reasoning modules, ensuring a nuanced and tailored approach to problem-solving for the LLM. For example, the generated reasoning modules may include a contextual understanding, a common knowledge evaluation, a sequence of events, a consideration of counterfactuals, and the like.

In one or more embodiments, the reasoning structure initializer may serve as a starting point for generating a task-specific reasoning structure. The reasoning structure initializer may use only the first reasoning module from the reasoning module generator to build an initial reasoning structure. The initial reasoning structure lays the groundwork for subsequent refinement steps, and ensures that the initial reasoning structure aligns closely with the context of the given task. Given the same task examples without labels, $t_i \in T$, the reasoning structure initializer may implement an initial key-value reasoning plan $\mathcal{S}$ by using the first reasoning module $\mathcal{R}_1$ generated by the reasoning module generator, an action plan of another task E and meta-prompt $\mathcal{P}_I$: $\mathcal{S} = \mathcal{M}(\mathcal{P}_I \| t_i \| \mathcal{R}_1 \| E)$. The action plan of the task E may provide an example reasoning structure in a given format as an example for the model to use in generating the reasoning plan.

In one or more embodiments, given the initial reasoning structure $\mathcal{S}$, , the reasoning structure evolver may iteratively distill the initial reasoning structure by incorporating additional reasoning modules $\mathcal{R}_i$ generated by the reasoning module generator and a meta-prompt $\mathcal{P}_E$, , an example-agnostic structured prompt designed to capture the reasoning structure of a specific category of tasks. By dynamically evolving the reasoning structure in this manner, the enhanced approach fosters a comprehensive and versatile framework capable of addressing a wider range of cognitive tasks with an LLM. Through empirical evaluation, the efficacy of the enhanced methodology herein in improving LLM reasoning performance and adaptability across various task domains contributes to enhancing LLM reasoning performance. The following equation represents the iterative nature of the reasoning structure evolver: $\mathcal{S}' = \mathcal{M}(\mathcal{P}_E \| \mathcal{R}_i \| \mathcal{S})$.

In one or more embodiments, the reasoning module generator may use the following template: "Given these task examples below, generate a set of high-level reasoning modules or thinking styles only that could be best useful for solving the same type of tasks. [Task examples without answer: Example 1, example 2, . . . , example N]," or, "Given the task examples above, generate a set of high-level reasoning modules or thinking styles only that could be useful for solving similar tasks. Do not give conclusions."

In one or more embodiments, an example template for the reasoning structure initializer may be as follows: "Operationalize the reasoning modules into a step-by-step reasoning plan in JSON format. [Example of reasoning module and a reasoning step-by-step land for another task in JSON format]. [Description of initial reasoning module from the reasoning module generator]. [Task examples without answer: Example 1, example 2, . . . , example N]. Implement a reasoning structure similar to the reasoning plan example for solvers to follow step-by-step and arrive at correct answers. Do not work out the solution for the task examples."

In one or more embodiments, an example template for the reasoning structure evolver may be as follows: "Starting from the provided reasoning plan below, which was generated based on an initial reasoning module, integrate the below new reasoning module into the reasoning plan so that it better helps solve the similar tasks to produce a correct answer. [Reasoning plan from previous run]. [Description of new reasoning module]. [Task examples without answer: Example 1, example 2, . . . , example N]. Adapt and optimize the above reasoning module into the provided step-by-step reasoning plan so that it better solves the similar tasks."

The enhanced prompting herein may be part of a foundational ML model service that allows users to select from foundation models accessed through a single application programming interface (API). The API may provide programmatic access to a console for a graphical user interface. In this manner, the enhanced prompting herein may be implemented as a cloud-based AI prompting service to improve performance of foundation models and customized and/or fine-tuned versions of models created using foundation models.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 is an example block diagram 110 showing enhanced large language model (LLM) prompt engineering, in accordance with one or more embodiments of the present disclosure.

Referring to FIG. 1, an enhanced prompt engineering 102 for LLMs may include a reasoning module generator 104, a reasoning structure initializer 106, and a reasoning structure evolver 108, each of which may include one or more modules. The reasoning module generator 104 may orchestrate the creation of a task-specific set of reasoning modules using a language model 110 (e.g., LLM) by prompting the language model 110 to generate a set of high-level reasoning modules or thinking styles that could be best useful for solving the same type of tasks, for example. Using $\mathcal{R} = \mathcal{M}(\mathcal{P} \| t_i)$ as described above, the language model 110 may output generated reasoning modules 112.

Still referring to FIG. 1, the reasoning structure initializer 106 may use only the first reasoning module from the generated reasoning modules 112 to build an initial reasoning structure by prompting the language model 110 with the generated reasoning modules 112 and instructions for the language model 110 to operationalize the reasoning modules into a step-by-step reasoning plan in JSON format, XML format, or another format. The language model 110 may generate an initial reasoning structure 114 based on the prompt from the reasoning structure initializer 106. Generating the initial reasoning structure 114 may apply $\mathcal{S} = \mathcal{M}(\mathcal{P} \| t_i \| \mathcal{R} \| E)$ as described above.

Still referring to FIG. 1, the initial reasoning structure 114 may iteratively be refined by the language model 110. The reasoning structure evolver 108 may prompt the language model with the initial reasoning structure 114 and instructions to integrate new reasoning module into the reasoning plan so that it better helps solve the similar tasks to produce a correct answer. Using $\mathcal{S}' = \mathcal{M}(\mathcal{P} \| \mathcal{R} \| S)$ as described above, the language model 110 may generate a refined reasoning structure 116.

In one or more embodiments, the generated reasoning modules 112 may include, but are not limited to: "Contextual understanding," "common knowledge of evaluation," "sequence of events," "consider counterfactuals," and the like.

In one or more embodiments, the initial reasoning structure 114 may include, as an example:

```
{"Identify the task and its requirements": ...
"Casual reasoning plan": {
    "Understand the scenario": {
        "Identify key elements":...
    }
}
```

In one or more embodiments, the refined reasoning structure 116 may include, as an example:

```
{"Identify the task and its requirements":...
"Casual reasoning plan":{
    "Understand the scenario":{
        "Identify key elements:
            "Clarify the sequence of events":...
```

-continued

```
},
"Apply oral, intentional, or counterfactual analysis":{
    "Moral responsibility":{
        "Evaluate actions and outcomes":...
    . . .
}
```

Figure 6:
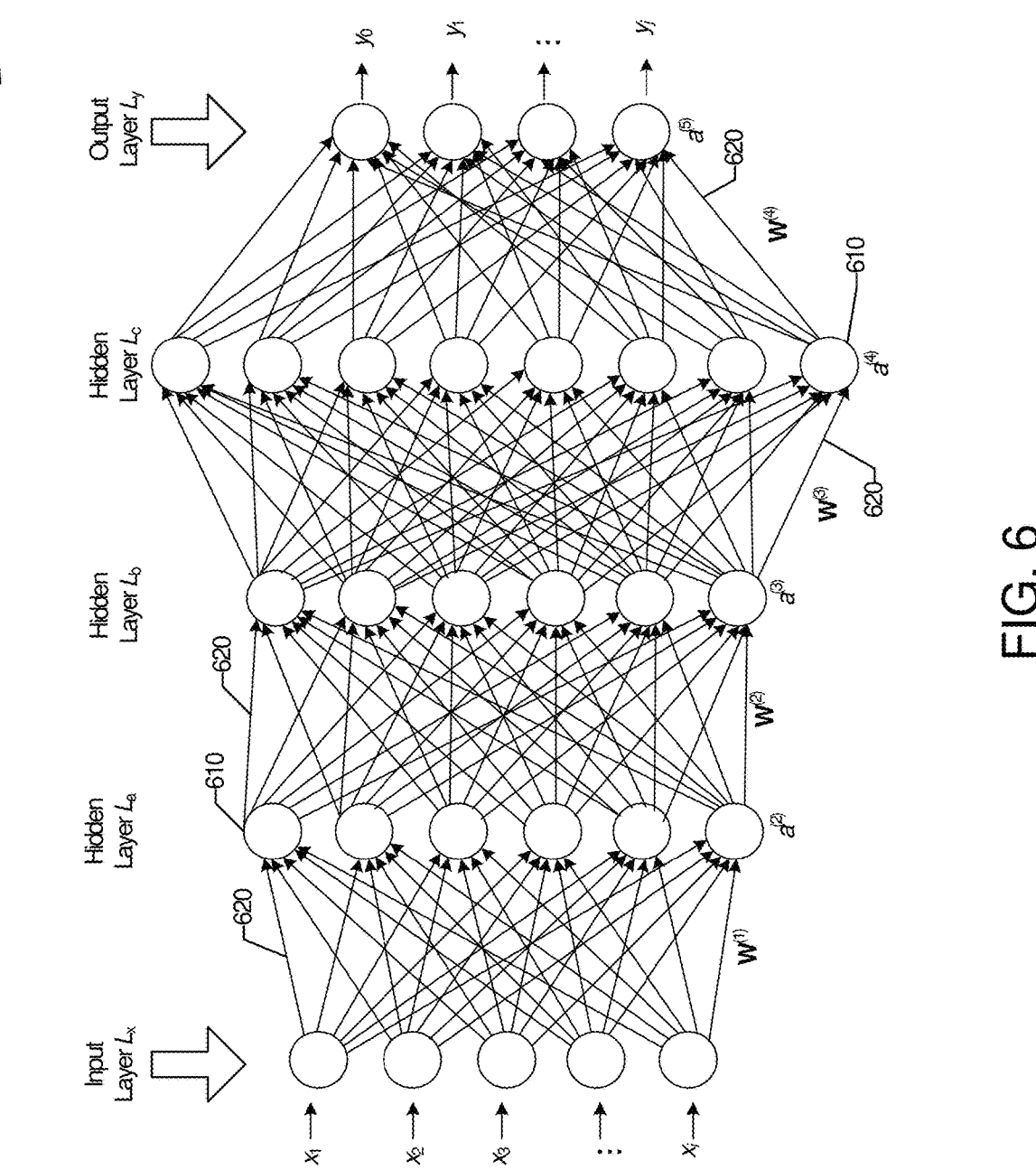
FIG. 6 illustrates an example neural network, in accordance with one or more embodiments.

The language model 100 may include one or more application-specific integrated circuits (ASICs) for machine learning models (e.g., FIG. 6 or other types of ML models described herein).

The reasoning module generator 104, the reasoning structure initializer 106, and the reasoning structure evolver 108 each may include one or more processors coupled to memory storing instructions that, when executed by the respective processor(s), cause performance of the operations described in FIGS. 1-5. The memory and processors may be separate, such as separate cloud-based or other services, or may be implemented by a same hardware.

In one or more embodiments, any of the prompts to the language model 110 may be combined. For example, a single prompt may request the language model 110 to generate the reasoning modules 112, generate the initial reasoning structure 114 (e.g., based on at least one of the reasoning modules 112), and/or generate the refined reasoning structure 116 (e.g., based on the initial reasoning structure 114). In this manner, the language model 110 may produce the same outputs without needing multiple separate prompts to be entered.

Figure 2:
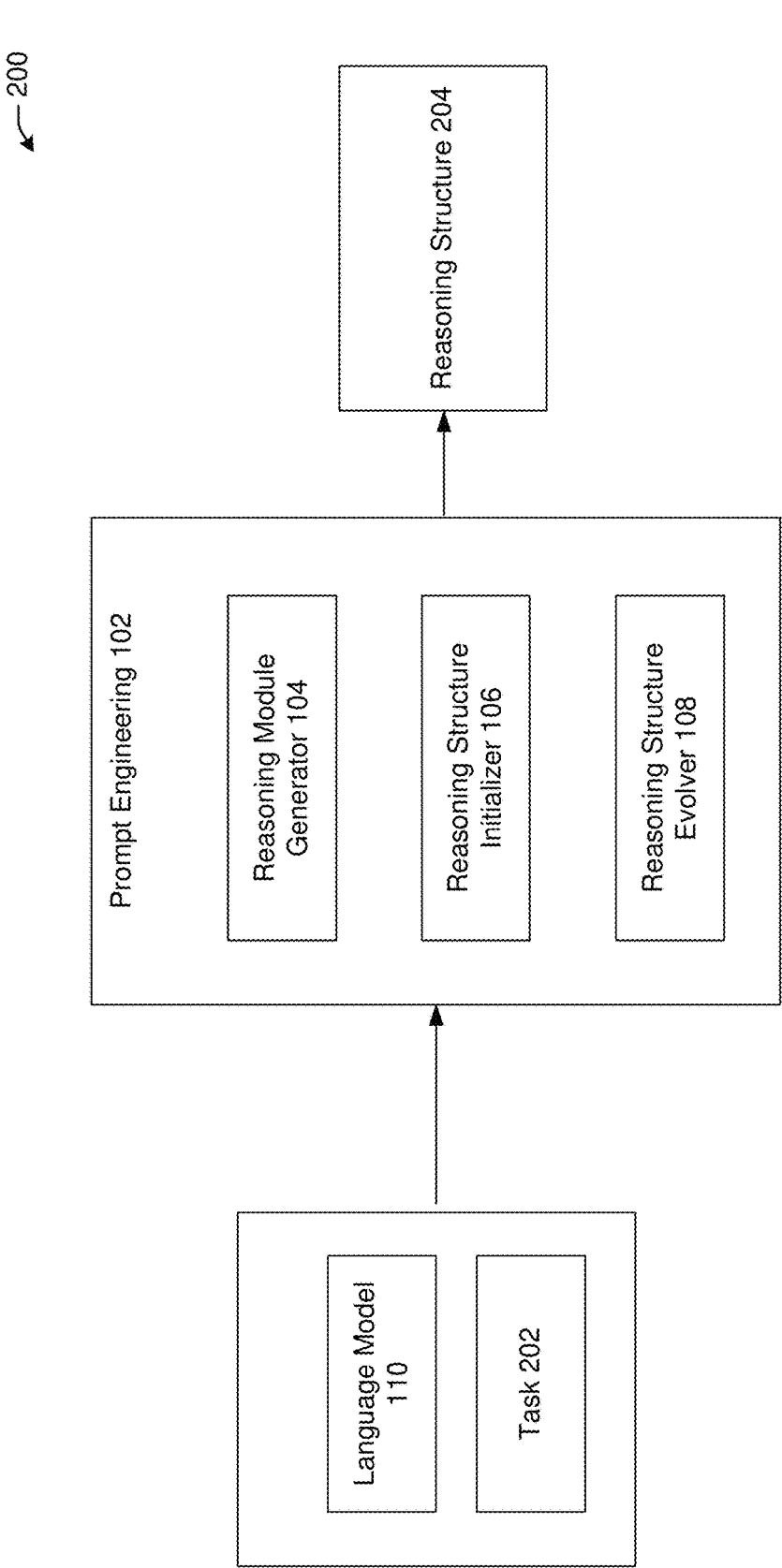
FIG. 2 is an example block diagram showing an example generation of a reasoning structure using the prompt engineering of FIG. 1, in accordance with one or more embodiments of the present disclosure.

FIG. 2 is an example block diagram 200 showing an example generation of a reasoning structure using the prompt engineering 102 of FIG. 1, in accordance with one or more embodiments of the present disclosure.

The prompt engineering 102 of FIG. 1 generates reasoning structures on a task-level, meaning that for a given task, the prompt engineering 102 may generate the initial reasoning structure 114 and the refined reasoning structure 116. In the example shown in FIG. 2, given the language model 110 and a given task 202 (e.g., an example task $t_i$), the prompt engineering may generate a reasoning structure 204 (e.g., the initial reasoning structure 114 and/or the refined reasoning structure 116). Example tasks for the task are provided below in Table 1.

TABLE 1

| Example Tasks for LLMs: LLM Task |
| --- |
| Boolean expressions |
| Casual judgement |
| Date understanding |
| Disambiguation |
| Dyck languages |
| Formal fallacies |
| Geometric shapes |
| Hyperbaton |
| Logical deduction seven objects |
| Movie recommendation |
| Multistep arithmetic two |
| Navigate |
| Object counting |
| Penguins in a table |
| Reasoning about colored objects |
| Ruin names |
| Salient translation error detection |
| Snarks |
| Sports understanding |
| Temporal sequences |

TABLE 1-continued

| Example Tasks for LLMs: LLM Task |
| --- |
| Tracking shuffled objects seven objects |
| Web of lies |
| Word sorting |

Using casual judgement reasoning as the task 202, the reasoning structure 204 may end up as follows:

```
{
"Casual reasoning plan": {
    "Understand the scenario":{
        "Identify key elements:
        "Clarify the sequence of events:"...
}
"Apply moral, intentional, or counterfactual analysis":{
    "Moral responsibility":{
        "Evaluate actions and outcomes":...
}
```

Figure 3:
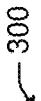
FIG. 3 is an example block diagram for generating an LLM answer based on the reasoning structure of FIG. 2, in accordance with one or more embodiments of the present disclosure.
Figure 3:
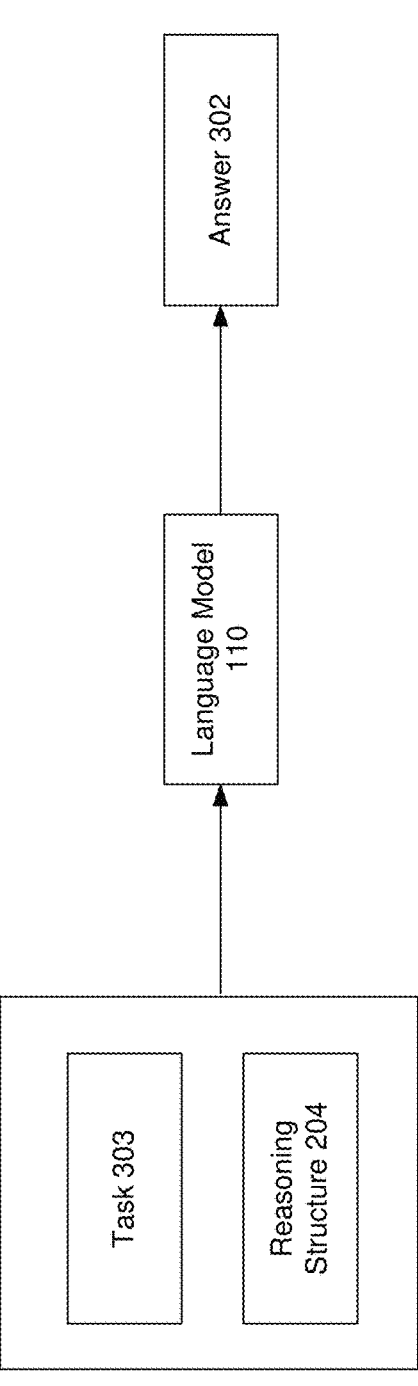

FIG. 3 is an example block diagram 300 for generating an LLM answer 302 based on the reasoning structure 204 of FIG. 2 and a task instance 303 of the task 202, in accordance with one or more embodiments of the present disclosure.

The reasoning structure 204 may be used by the language model 110 to solve tasks on an instance level. For a prompt including the task instance 303 and the reasoning structure 204 produced by the prompt engineering 102, the language model 110 may generate an answer 302 to the prompt. For example, the prompt may ask the language model 110 to follow instructions step-by-step using the reasoning structure 204.

Referring to FIGS. 1-3, the prompts used at the reasoning module generation stage, the initial reasoning structure stage, and the refined reasoning structure stage may be meta-prompts. The meta-prompt templates may be as follows.

In one or more embodiments, the reasoning module generator may use the following template: "Given these task examples below, generate a set of high-level reasoning modules or thinking styles only that could be best useful for solving the same type of tasks. [Task examples without answer: Example 1, example 2, . . . , example N]," or, "Given the task examples above, generate a set of high-level reasoning modules or thinking styles only that could be useful for solving similar tasks. Do not give conclusions."

In one or more embodiments, an example template for the reasoning structure initializer may be as follows: "Operationalize the reasoning modules into a step-by-step reasoning plan in JSON format. [Example of reasoning module and a reasoning step-by-step land for another task in JSON format]. [Description of initial reasoning module from the reasoning module generator]. [Task examples without answer: Example 1, example 2, . . . , example N]. Implement a reasoning structure similar to the reasoning plan example for solvers to follow step-by-step and arrive at correct answers. Do not work out the solution for the task examples."

In one or more embodiments, an example template for the reasoning structure evolver may be as follows: "Starting from the provided reasoning plan below, which was generated based on an initial reasoning module, integrate the below new reasoning module into the reasoning plan so that it better helps solve the similar tasks to produce a correct answer. [Reasoning plan from previous run]. [Description of new reasoning module]. [Task examples without answer: Example 1, example 2, . . . , example N]. Adapt and optimize the above reasoning module into the provided step-by-step reasoning plan so that it better solves the similar tasks."

Figure 4:
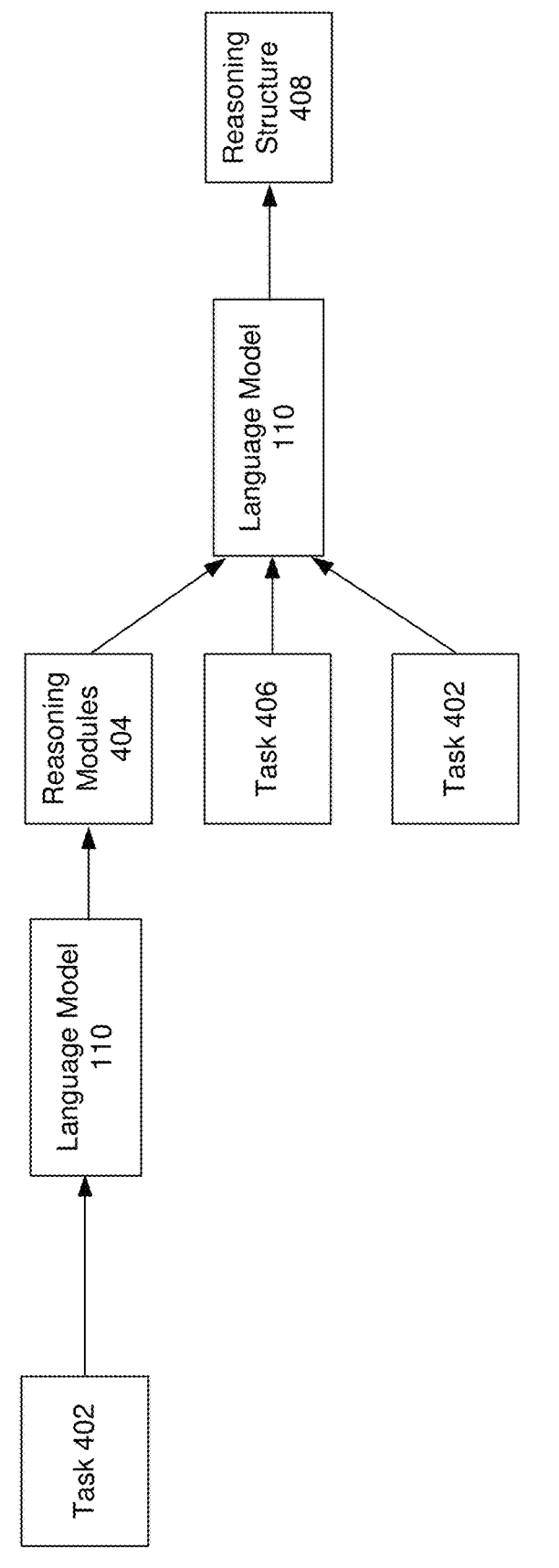
FIG. 4 is an example block diagram representing the reasoning module generation and the reasoning structure initialization of FIG. 1, in accordance with one or more embodiments of the present disclosure.

FIG. 4 is an example block diagram 400 representing the reasoning module generation and the reasoning structure initialization of FIG. 1, in accordance with one or more embodiments of the present disclosure.

Referring to FIG. 4, a task 402 (e.g., representing the $T$ in $\mathcal{R} = \mathcal{M}(\mathcal{P}_G \| t_i)$ above where $t_i \in T$) may be input as a meta-prompt $\mathcal{P}$: $\mathcal{R} = \mathcal{M}(\mathcal{P} \| t_i)$ to the language model 110 to prompt the language model 110 to generate a set of task-specific reasoning modules $\mathcal{R}$. The language model 110 may generate reasoning modules 404 (e.g., representing the $\mathcal{R}$). The reasoning modules 404, the task 402, and another task's reasoning structure 406 (e.g., the other task E in $\mathcal{S} = \mathcal{M}(\mathcal{P} \| t_i \| \mathcal{R}_1 \| E)$ may be used in a meta-prompt to the language model 110 to generate a reasoning structure 408 (e.g., the initial reasoning structure 114).

Given only a few task examples without labels, $t_i \in T$, , the reasoning module generator 104 first creates a set of task-specific reasoning modules $\mathcal{R}$ (e.g., the reasoning modules 404) by using a model $\mathcal{M}$ and a meta-prompt $\mathcal{P}_G$: $\mathcal{R} = \mathcal{M}(\mathcal{P}_G \| t_i)$ (e.g., including the task 402).

By assessing the unique attributes and demands of each task, the reasoning module generator 104 orchestrates the creation of a task-specific set of reasoning modules, ensuring a nuanced and tailored approach to problem-solving for the language model 110.

In one or more embodiments, the reasoning structure initializer 106 may serve as a starting point for generating the task-specific reasoning structure. The reasoning structure initializer 106 may use only the first reasoning module from the reasoning modules 404 to build an initial reasoning structure (e.g., the reasoning structure 408). The initial reasoning structure lays the groundwork for subsequent refinement steps (e.g., FIG. 5), and ensures that the initial reasoning structure aligns closely with the context of the given task. Given the same task examples without labels, $t_i \in T$, the reasoning structure initializer 106 may implement an initial key-value reasoning plan $\mathcal{S}$ by using the first reasoning module $\mathcal{R}_1$ generated by the reasoning module generator, an action plan of another task E and meta-prompt $\mathcal{P}_I$: $\mathcal{S} = \mathcal{M}(\mathcal{P}_I \| t_i \| \mathcal{R}_1 \| E)$, as illustrated by the corresponding elements in FIG. 4.

Figure 5:
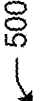
FIG. 5 is an example block diagram representing the refined reasoning of FIG. 1, in accordance with one or more embodiments of the present disclosure.
Figure 5:
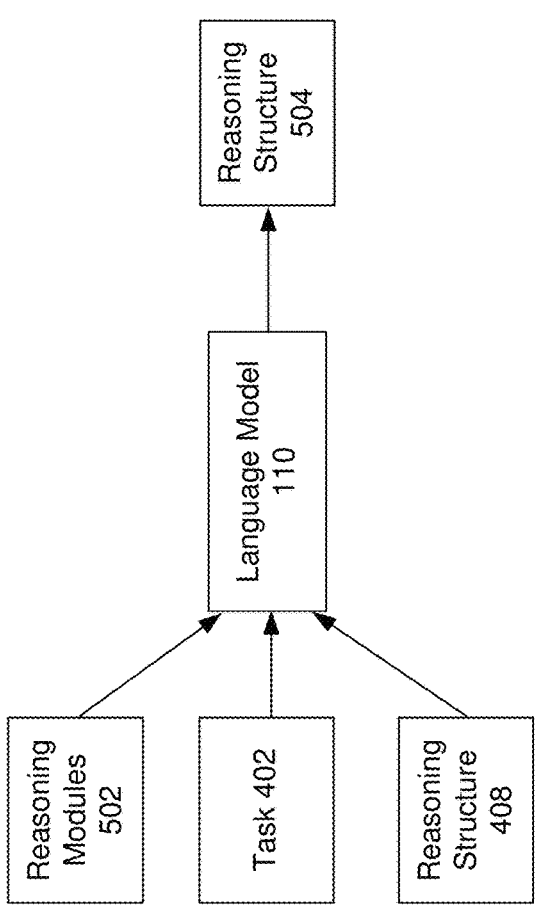

FIG. 5 is an example block diagram 500 representing the refined reasoning 116 of FIG. 1, in accordance with one or more embodiments of the present disclosure.

Referring to FIG. 5, reasoning modules 502 (e.g., the $\mathcal{R}_i$ in $\mathcal{S}' = \mathcal{M}(\mathcal{P}_E | \mathcal{R}_i | \mathcal{S})$, the task 402 of FIG. 4, and the reasoning structure 408 of FIG. 4 may be used in a meta-prompt to the language model 110 to prompt the language model to refine the reasoning structure 408. The resulting output of the language model 110 may be a reasoning structure 504, representing $\mathcal{S}'$ of $\mathcal{S}' = \mathcal{M}(\mathcal{P}_E \| \mathcal{R}_i \| \mathcal{S})$.

In this manner, given the initial reasoning structure S, the reasoning structure evolver 108 may iteratively distill the initial reasoning structure (e.g., reasoning structure 408) by incorporating additional reasoning modules $\mathcal{R}_i$ (e.g., the reasoning modules 502) generated by the reasoning module generator 104 and a meta-prompt $\mathcal{P}_E$, an example-agnostic structured prompt designed to capture the reasoning structure of a specific category of tasks. By dynamically evolving the reasoning structure 408 in this manner, the enhanced approach fosters a comprehensive and versatile framework capable of addressing a wider range of cognitive tasks with the language model 110. The following equation represents the iterative nature of the reasoning structure evolver 108, as illustrated by the corresponding elements in FIG. 5: $\mathcal{S}'=\mathcal{M}(\mathcal{P}_E\|\mathcal{R}_i\|\mathcal{S})$.

Referring to FIGS. 1-5, various tasks, reasoning modules, and reasoning structures may be applied based on the described concepts, but are not limited to only the examples herein. In one example, the task may be a hyperbaton task such as: "Which sentence has the correct adjective order between option (a) large archaic red Indonesian sock, or (b) large red Indonesian archaic sock." The reasoning structure may be as follows:

{

"Linguistic Analysis":{"Analyze the syntax and semantics of the sentences. Identify subject-verb relationships and objects. Use this to extract precise meaning.}

"Pattern Recognition":{

"Look for patterns in the adjective order that match or violate the standard sequence." . . . }

"Comparative Analysis":{ . . . }

The solution to the above example may be as follows:

"Linguistic Analysis" {

"Analyze sentence structure": "Both sentences are structured with a series of adjectives followed by a noun. The adjective describe the noun 'sock.'"

"Adjective Order Rules":: The conventional order of adjectives in English is quantity or number, quality or opinion, size, age, shape, color, proper adjective, and purpose or qualifier. "}, "Pattern Recognition": "In both sentences, the pattern of adjective order begins with size ('large'), followed by other descriptive adjectives and ending with the noun ('sock').", "Comparative Analysis": "Sentence (a) follows the pattern: size ('large'), age ('archaic'), color ('red'), proper adjective ('Indonesian'). Sentence (b) follows the pattern: size ('large'), color ('red'), proper adjective ('Indonesian'), age ('archaic').", "Critical Thinking": "Sentence (b) places the age adjective ('archaic') after the color ('red') and nationality ('Indonesian'), which deviates from the conventional order."

tion may include: (1) A poster explicitly mentions that they are building a serverless web application; (2) a poster mentions some cloud services that are likely for the use of building a serverless web application; (3) a post describes integration with an API gateway or a similar API management service; (4) a post indicates no direct management of server instances or infrastructure; (5) posts reference serverless architecture benefits such as automatic scaling or pay-per-use; (6) a poser uses a cloud provider's manage services for backend processing and storage, and the use case has to be a serverless web application. Additional criteria for when something is not a serverless web application may include: (1) a post is related to a smart home device or Internet of Things; (2) a post is related to a serverless mobile application; or (3) if all context in a post is purely around services itself, then there is no information that may be inferred that the poster's use case is a serverless web application.

Example generated reasoning modules may include, but are not limited to, the following: (1) categorical reasoning: the ability to identify and apply predefined categories or classifications based on specific criteria or conditions; (2) conditional logic: the ability to evaluate and follow conditional statements or rules, such as "if-then" statements, to make decisions or classifications; (3) contextual analysis: the ability to analyze and extract relevant information from the given context or problem statement to determine an appropriate category or classification; (4) exception handling: the ability to identify and handle exceptions or special cases that may override or modify the default classification rules or criteria; (5) domain knowledge: the ability to leverage domain-specific knowledge or understanding of the problem context to aid in the classification process; (6) attention to detail: the ability to carefully analyze and consider all relevant details and information provided in the problem statement to make accurate classifications.

In another example, when the task is a pain point classification, the generated reasoning structure may be as follows:

```
{
"Identify the Task": {
        "Task Type": "Classification", "Task Description": "Classify a post based on definition
..." },
"Identify Category Definitions": {
"Category A: Post related to Serverless Web Application": { "Conditions": Scenario
Information...},
"Category B: Post not related to Serverless Web Application": "Posts not categorized as Category
A" }},
"Identify Exceptions": { "Exception": Exception Detail },
"Analyze Post Content": {
        "Step 1": "Extract relevant information from the post",
        "Step 2": "Check the scenario one by one and give analysis ",
        ...... },
"Apply Reasoning Modules": ......},
"Classify Post": {
        "Step 1": "Analyze the post content and context",
        "Step 2": "Check if any of the conditions for Category A are met",
        ..., (Exception Check is here)
        "Step 5": "If any exception is met, classify the post into Category B", ..." }
"Conclusion":
}
```

"Make a judgement": "Sentence (a) has the correct adjective order according to standard English conventions."

"Final Answer": "Sentence (a) has the correct adjective order."}

In another example, the task may be to classify a serverless web application. Criteria for a serverless web applica- In an example pain point classification, an example post may be: "How should I enable by API gateway to use a custom domain?" The post may seem to be related to setting up a custom domain for accessing a serverless computing function through an API gateway. The key points may include: (1) the user has registered a domain name and is using nameservers; (2) the user has created a subdomain and wants to use it to access their serverless computing function; (3) the user has tried using a proxy, but results in a 403 Forbidden error; (4) the user has tried using a CNAME record pointing to the API gateway domain, but results in an untrusted certificate error; (5) the user has tried using a redirect, but does not work due to preflight checks; and (6) the user has mentioned the possibility of using Route 53, but wants a simpler solution. Based on the information provided, the post seems to be related to setting up a serverless web application as it involves using a serverless computing function and API Gateway (Scenario 3). However, the post does not explicitly mention any of the conditions listed in a particular category (A). The post is more focused on the domain configuration aspect rather than the serverless architecture itself. Using Direct Prompt, the language model 110 accuracy is 65%. Using 2-shot CoT, the language model 110 accuracy is 73%. Using 5-shot CoT, the language model 110 accuracy is 77%. Using the enhanced prompting herein, the language model 110 accuracy is 80.5% in this example.

In one or more embodiments, the enhanced prompting techniques of FIGS. 1-5 may be implemented in a cloud-based service or command line interface with which users may select from foundation ML models, and in other services operating in an application layer. A user interface may allow a user to select an auto-prompt generator option, which may allow a user to create a custom task-specific prompt. The user may select which LLM they want to use, the framework, the task/domain with which they want to work (e.g., classification, sentiment analysis, question and answering, etc.), optional sample data on which they want to test or evaluate the prompt, optional input labels in case of tasks such as classification in which they want the model to limit the output to specific categories, and/or optional few-shot examples to refine the LLM output. Once the user has selected their inputs, the user may select a "generate prompt" option to cause generation of an automated task-specific prompt using the techniques shown in FIGS. 1-5.

When the user selects the "generate prompt" option above, a prompt may be created based on the inputs entered by the user. The prompt may be customized for an LLM for a particular task/domain. In one example, the task/domain may be question and answer, and the prompt may use few-shot examples and labels entered by the user. For example, the task may be, "Determine which of the sentences has the correct adjective order: Example 1: (A) He is wearing a blue dirty pair of trousers. (B) He is wearing a dirty blue pair of trousers. Example 2: (A) The lion has sharp, enormous, big teeth. (B) The lion has big, sharp, enormous teeth.

In another example, the prompt may instruct the selected model to follow a step-by-step reasoning plan in JSON format to correctly solve a task, and fill in values following keys by reasoning specifically about the task given without rephrasing the keys. The reasoning structure that may be generated using the techniques in FIGS. 1-5 may looks as follows:

```
Reasoning Structure:
{
"reasoning_plan":[
{
  "module": "Linguistic Analysis",
  "steps": [
    {"step": "Analyze sentence structure",
    "description": "Break down each sentence to identify the structure
```

-continued

```
and components, such as nouns, adjectives, and their order."
    }
  ]
}
{
  "module": "Adjective Order Rules",
  "steps": [
    {
    "step": "identify adjective order",
    "description": "Apply rules to determine the conventional order
of adjectives (e.g., quantity, quality, size, age, shape, color, proper
adjective, purpose)."
    }
  ]
}
...
```

In the above reasoning structure, there are multiple reasoning modules, including "Linguistic Analysis" and "Adjective Order Rules," which may be generated using the reasoning module generator 104, and which may include one or more steps. The above reasoning structure is specific to a task specified by a user (e.g., classification). A user may optionally select sample data (e.g., files), input labels (e.g., files), and/or few-shot examples (e.g., files) to include in the prompt. A task is passed to an individual task. The user may select the finalized prompt that is auto-generated using the inputs provided by the user to be input to the language model 110 to instruct the language model 110. The language model 110 may generate an answer accordingly.

In one or more embodiments, a user may edit the final prompt used to instruct the LLM to generate an answer so that the prompt may be used by one or more applications and/or services.

Referring to FIGS. 1-5, the language model 110 is shown, but the techniques applied to it are not limited to machine learning models only in the form of language models. The language model 110 may represent other types of machine learning models capable of responding to tasks and providing the outputs. The machine learning model may be multimodal to allow for different inputs, such as text, images, video, audio, or the like.

FIG. 6 illustrates an example neural network 600, in accordance with one or more embodiments. The example neural network (NN) 600 may represent at least a portion of the language model 110 (e.g., a transformer NN of a LLM).

The neural network (NN) 600 may be suitable for use by one or more of the computing systems (or subsystems) of the various implementations discussed herein, implemented in part by a HW accelerator, and/or the like. The NN 600 may be deep neural network (DNN) used as an artificial brain of a compute node or network of compute nodes to handle very large and complicated observation spaces. Additionally or alternatively, the NN 600 can be some other type of topology (or combination of topologies), such as a convolution NN (CNN), deep CNN (DCN), recurrent NN (RNN), Long Short Term Memory (LSTM) network, a Deconvolutional NN (DNN), gated recurrent unit (GRU), deep belief NN, a feed forward NN (FFN), a deep FNN (DFF), deep stacking network, Markov chain, perception NN, Bayesian Network (BN) or Bayesian NN (BNN), Dynamic BN (DBN), Linear Dynamical System (LDS), Switching LDS (SLDS), Optical NNs (ONNs), an NN for reinforcement learning (RL) and/or deep RL (DRL), and/or the like. NNs are usually used for supervised learning, but can be used for unsupervised learning and/or reinforcement (RL).

The NN 600 may encompass a variety of ML techniques where a collection of connected artificial neurons 610 that (loosely) model neurons in a biological brain that transmit signals to other neurons/nodes 610. The neurons 610 may also be referred to as nodes 610, processing elements (PEs) 610, or the like. The connections 620 (or edges 620) between the nodes 610 are (loosely) modeled on synapses of a biological brain and convey the signals between nodes 610. Note that not all neurons 610 and edges 620 are labeled in FIG. 6 for the sake of clarity.

Each neuron 610 has one or more inputs and produces an output, which can be sent to one or more other neurons 610 (the inputs and outputs may be referred to as "signals"). Inputs to the neurons 610 of the input layer $L_x$ can be feature values of a sample of external data (e.g., input variables $x_i$). The input variables $x_i$ can be set as a vector containing relevant data (e.g., observations, ML features, and the like). The inputs to hidden units 610 of the hidden layers $L_a$, $L_b$, and $L_c$ may be based on the outputs of other neurons 610. The outputs of the final output neurons 610 of the output layer $L_y$ (e.g., output variables y;) include predictions, inferences, and/or accomplish a desired/configured task. The output variables $y_j$ may be in the form of determinations, inferences, predictions, and/or assessments. Additionally or alternatively, the output variables $y_j$ can be set as a vector containing the relevant data (e.g., determinations, inferences, predictions, assessments, and/or the like).

In the context of ML, an "ML feature" (or simply "feature") is an individual measureable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features.

Neurons 610 may have a threshold such that a signal is sent only if the aggregate signal crosses that threshold. A node 610 may include an activation function, which defines the output of that node 610 given an input or set of inputs. Additionally or alternatively, a node 610 may include a propagation function that computes the input to a neuron 610 from the outputs of its predecessor neurons 610 and their connections 620 as a weighted sum. A bias term can also be added to the result of the propagation function.

The NN 600 also includes connections 620, some of which provide the output of at least one neuron 610 as an input to at least another neuron 610. Each connection 620 may be assigned a weight that represents its relative importance. The weights may also be adjusted as learning proceeds. The weight increases or decreases the strength of the signal at a connection 620.

The neurons 610 can be aggregated or grouped into one or more layers L where different layers L may perform different transformations on their inputs. In FIG. 6, the NN 600 comprises an input layer $L_x$, one or more hidden layers $L_a$, $L_b$, and $L_c$, and an output layer $L_y$ (where a, b, c, x, and y may be numbers), where each layer L comprises one or more neurons 610. Signals travel from the first layer (e.g., the input layer $L_1$), to the last layer (e.g., the output layer $L_y$), possibly after traversing the hidden layers $L_a$, $L_b$, and $L_c$ multiple times. In FIG. 6, the input layer $L_a$ receives data of input variables $x_i$ (where i=1, . . . , p, where p is a number). Hidden layers $L_a$, $L_b$, and $L_c$ processes the inputs $x_i$, and eventually, output layer $L_y$ provides output variables y;

(where j=1, . . . , p', where p' is a number that is the same or different than p). In the example of FIG. 6, for simplicity of illustration, there are only three hidden layers $L_a$, $L_b$, and $L_c$ in the NN 600, however, the NN 600 may include many more (or fewer) hidden layers $L_a$, $L_b$, and $L_c$ than are shown.

The examples herein are not meant to be limiting.

Figure 7:
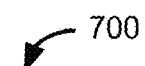
FIG. 7 illustrates a block diagram of an example machine upon which any of one or more techniques (e.g., methods) may be performed, in accordance with one or more example embodiments of the present disclosure.

FIG. 7 illustrates a block diagram of an example machine upon which any of one or more techniques (e.g., methods) may be performed, in accordance with one or more example embodiments of the present disclosure.

In other embodiments, the machine 700 may operate as a standalone device or may be connected (e.g., networked) to other machines. In a networked deployment, the machine 700 may operate in the capacity of a server machine, a client machine, or both in server-client network environments. The machine 700 may be a server, a personal computer (PC), a smart home device, a tablet PC, a personal digital assistant (PDA), a mobile telephone, a wearable computer device, a web appliance, a network device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine 700 (e.g., computer system) may include a hardware processor 702 (e.g., a central processing unit (CPU), a graphics processing unit (GPU), a hardware processor core, a tensor processing unit (TPU), or any combination thereof), a main memory 704 and a static memory 706, some or all of which may communicate with each other via an interlink (e.g., bus 708). The machine 700 may further include a power device 732, a graphics display device 710, an input device 712 (e.g., a keyboard), and a user interface UI navigation device 714 (e.g., a mouse). In an example, the graphics display device 710, input device 712, and UI navigation device 714 may be a touch screen display. The machine 700 may additionally include a storage device 716, a signal generation device 718, one or more prompt modules 719 (e.g., representing the reasoning module generator 104, the reasoning structure initializer 106, and/or the reasoning structure evolver 108, and capable of performing the operations of FIGS. 1-5, including using the language model 110 to generate reasoning modules, initial reasoning structures, and refined reasoning structures for enhanced LLM prompting), and a network interface 720 coupled to antenna(s) 730. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface 720 may include one or more physical jacks (e.g., Ethernet, coaxial, or phone jacks) or one or more antennas to connect to the communications network 726. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "compute resource" or simply "resource" at least in some examples refers to an object with a type, associated data, a set of methods that operate on it, and, if applicable, relationships to other resources. Additionally or alternatively, the term "compute resource" or "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and the like), operating systems, virtual machines (VMs), software/applications, computer files, and/or the like. A "hardware resource" at least in some examples refers to compute, storage, and/or network resources provided by physical hardware element(s). A "virtualized resource" at least in some examples refers to compute, storage, and/or network resources provided by virtualization infrastructure to an application, device, system, and the like. The term "network resource" or "communication resource" at least in some examples refers to resources that are accessible by computer devices/systems via a communications network. The term "system resources" at least in some examples refers to any kind of shared entities to provide services, and includes computing and/or network resources. System resources may be considered as a set of coherent functions, network data objects or services, accessible through a server where such system resources reside on a single host or multiple hosts and are clearly identifiable.

The term "cloud service provider" or "CSP" at least in some examples refers to an organization that operates or otherwise provides cloud resources including, for example, centralized, regional, and/or edge data centers and/or the like. In some examples, the term "cloud computing" refers to computing resources and services offered by a CSP.

The term "data center" at least in some examples refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like.

The terms "instantiate," "instantiation," and the like at least in some examples refers to the creation of an instance. In some examples, an "instance" also at least in some examples refers to a concrete occurrence of an object, which may occur, for example, during execution of program code.

The term "feature" at least in some examples refers to an individual measureable property, quantifiable property, or characteristic of a phenomenon being observed. Additionally or alternatively, the term "feature" at least in some examples refers to an input variable used in making predictions. At least in some examples, features may be represented using numbers/numerals (e.g., integers), strings, variables, ordinals, real-values, categories, and/or the like.

The term "feature engineering" at least in some examples refers to a process of determining which features might be useful in training an ML model, and then converting raw data into the determined features. Feature engineering is sometimes referred to as "feature extraction."

The term "feature extraction" at least in some examples refers to a process of dimensionality reduction by which an initial set of raw data is reduced to more manageable groups for processing. Additionally or alternatively, the term "feature extraction" at least in some examples refers to retrieving intermediate feature representations calculated by an unsupervised model or a pretrained model for use in another model as an input. Feature extraction is sometimes used as a synonym of "feature engineering."

The term "feature map" at least in some examples refers to a function that takes feature vectors (or feature tensors) in one space and transforms them into feature vectors (or feature tensors) in another space. Additionally or alternatively, the term "feature map" at least in some examples refers to a function that maps a data vector (or tensor) to feature space. Additionally or alternatively, the term "feature map" at least in some examples refers to a function that applies the output of one filter applied to a previous layer. In some embodiments, the term "feature map" may also be referred to as an "activation map".

The term "feature vector" at least in some examples, in the context of ML, refers to a set of features and/or a list of feature values representing an example passed into a model. Additionally or alternatively, the term "feature vector" at least in some examples, in the context of ML, refers to a vector that includes a tuple of one or more features.

The term "forward propagation" or "forward pass" at least in some examples, in the context of ML, refers to the calculation and storage of intermediate variables (including outputs) for a neural network in order from the input layer to the output layer.

The term "hidden layer", in the context of ML and NNs, at least in some examples refers to an internal layer of neurons in an ANN that is not dedicated to input or output. The term "hidden unit" refers to a neuron in a hidden layer in an ANN.

The term "hyperparameter" at least in some examples refers to characteristics, properties, and/or parameters for an ML process that cannot be learnt during a training process. Hyperparameter are usually set before training takes place, and may be used in processes to help estimate model parameters. Examples of hyperparameters include model size (e.g., in terms of memory space, bytes, number of layers, and the like); training data shuffling (e.g., whether to do so and by how much); number of evaluation instances, iterations, epochs (e.g., a number of iterations or passes over the training data), or episodes; number of passes over training data; regularization; learning rate (e.g., the speed at which the algorithm reaches (converges to) optimal weights); learning rate decay (or weight decay); momentum; number of hidden layers; size of individual hidden layers; weight initialization scheme; dropout and gradient clipping thresholds; the C value and sigma value for SVMs; the k in k-nearest neighbors; number of branches in a decision tree; number of clusters in a clustering algorithm; vector size; word vector size for NLP and NLU; and/or the like.

The term "inference engine" at least in some examples refers to a component of a computing system that applies logical rules to a knowledge base to deduce new information.

The terms "instance-based learning" or "memory-based learning" in the context of ML at least in some examples refers to a family of learning algorithms that, instead of performing explicit generalization, compares new problem instances with instances seen in training, which have been stored in memory. Examples of instance-based algorithms include k-nearest neighbor, and the like), decision tree Algorithms (e.g., Classification And Regression Tree (CART), Iterative Dichotomiser 3 (ID3), C4.5, chi-square automatic interaction detection (CHAID), and the like), Fuzzy Decision Tree (FDT), and the like), Support Vector Machines (SVM), Bayesian Algorithms (e.g., Bayesian network (BN), a dynamic BN (DBN), Naive Bayes, and the like), and ensemble algorithms (e.g., Extreme Gradient Boosting, voting ensemble, bootstrap aggregating ("bagging"), Random Forest and the like.

The term "loss function" or "cost function" at least in some examples refers to an event or values of one or more variables onto a real number that represents some "cost" associated with the event. A value calculated by a loss function may be referred to as a "loss" or "error". Additionally or alternatively, the term "loss function" or "cost function" at least in some examples refers to a function used to determine the error or loss between the output of an algorithm and a target value. Additionally or alternatively, the term "loss function" or "cost function" at least in some examples refers to a function are used in optimization problems with the goal of minimizing a loss or error.

The term "mathematical model" at least in some examples refer to a system of postulates, data, and inferences presented as a mathematical description of an entity or state of affairs including governing equations, assumptions, and constraints. The term "statistical model" at least in some examples refers to a mathematical model that embodies a set of statistical assumptions concerning the generation of sample data and/or similar data from a population; in some examples, a "statistical model" represents a data-generating process.

The term "machine learning" or "ML" at least in some examples refers to the use of computer systems to optimize a performance criterion using example (training) data and/or past experience. ML involves using algorithms to perform specific task(s) without using explicit instructions to perform the specific task(s), and/or relying on patterns, predictions, and/or inferences. ML uses statistics to build ML model(s) (also referred to as "models") in order to make predictions or decisions based on sample data (e.g., training data).

The term "machine learning model" or "ML model" at least in some examples refers to an application, program, process, algorithm, and/or function that is capable of making predictions, inferences, or decisions based on an input data set and/or is capable of detecting patterns based on an input data set. In some examples, a "machine learning model" or "ML model" is trained on a training data to detect patterns and/or make predictions, inferences, and/or decisions. In some examples, a "machine learning model" or "ML model" is based on a mathematical and/or statistical model. For purposes of the present disclosure, the terms "ML model", "AI model", "AI/ML model", and the like may be used interchangeably.

The term "machine learning algorithm" or "ML algorithm" at least in some examples refers to an application, program, process, algorithm, and/or function that builds or estimates an ML model based on sample data or training data. Additionally or alternatively, the term "machine learning algorithm" or "ML algorithm" at least in some examples refers to a program, process, algorithm, and/or function that learns from experience w.r.t some task(s) and some performance measure(s)/metric(s), and an ML model is an object or data structure created after an ML algorithm is trained with training data. For purposes of the present disclosure, the terms "ML algorithm", "AI algorithm", "AI/ML algorithm", and the like may be used interchangeably. Additionally, although the term "ML algorithm" may refer to different concepts than the term "ML model," these terms may be used interchangeably for the purposes of the present disclosure.

The term "machine learning application" or "ML application" at least in some examples refers to an application, program, process, algorithm, and/or function that contains some AI/ML model(s) and application-level descriptions. Additionally or alternatively, the term "machine learning application" or "ML application" at least in some examples refers to a complete and deployable application and/or package that includes at least one ML model and/or other data capable of achieving a certain function and/or performing a set of actions or tasks in an operational environment. For purposes of the present disclosure, the terms "ML application", "AI application", "AI/ML application", and the like may be used interchangeably.

The term "machine learning entity" or "ML entity" at least in some examples refers to an entity that is either an ML model or contains an ML model and ML model-related metadata that can be managed as a single composite entity (in some examples, metadata may include, for example, the applicable runtime context for the ML model). For purposes of the present disclosure, the term "AI/ML entity" or "ML entity" at least in some examples refers to an entity that is either an AI/ML model and/or contains an AI/ML model and that can be managed as a single composite entity. Additionally, the term "ML entity training" at least in some examples refers to ML model training associated with an ML entity. Moreover, the term "AI/ML" may be used interchangeably with the terms "AI" and "ML" throughout the present disclosure.

The term "AI decision entity", "machine learning decision entity", or "ML decision entity" at least in some examples refers to an entity that applies a non-AI and/or non-ML based logic for making decisions that can be managed as a single composite entity.

The term "machine learning training", "ML training", or "MLT" at least in some examples refers to capabilities and associated end-to-end (e2e) processes to enable an ML training function to perform ML entity (or ML model) training (e.g., as defined herein). In some examples, ML training capabilities include interaction with other parties/entities to collect and/or format the data required for ML model training. Additionally or alternatively, "training an ML entity" refers to training one or more ML model(s) associated with an ML entity internally by an MLT function.

The term "machine learning model training" or "ML model training" at least in some examples refers to capabilities of an ML training function to take data, run the data through an ML model, derive associated loss, optimization, and/or objective/goal, and adjust the parameterization of the ML model based on the computed loss, optimization, and/or objective/goal.

The term "ML initial training" at least in some examples refers to ML entity training that generates an initial version of a trained ML entity.

The term "ML re-training" at least in some examples refers to MLT that generates a new version of a trained ML entity using the same type, but different values or distributions, of training data as that used to train the previous version of the ML entity. This new version of the trained ML entity (e.g., the re-trained ML entity) supports the same type of inference as the previous version of the ML entity, e.g., the data type of inference input and data type of inference output remain unchanged between the two versions of the ML entity The term "machine learning training function", "ML training function", or "MLT function" at least in some examples refers to a (logical) function with MLT capabilities.

The term "AI/ML inference function" or "ML inference function" at least in some examples refers to a (logical) function (or set of functions) that employs an ML model and/or AI decision entity to conduct inference. Additionally or alternatively, the term "AI/ML inference function" or "ML inference function" at least in some examples refers to an inference framework used to run a compiled model in the inference host. In some examples, an "AI/ML inference function" or "ML inference function" may also be referred to an "model inference engine", "ML inference engine", or "inference engine".

The term "machine learning workflow" or "ML workflow" at least in some examples refers to a process including data collection and preparation, AI/ML model building/ generation; ML model training and testing; ML model deployment, ML model execution, ML model validation and/or verification; continuous, periodic and/or asynchronous ML model monitoring; ML model tuning, learning, and/or retraining. In some examples, the ML model monitoring includes self-monitoring or autonomous monitoring). In some examples, the ML model tuning, learning, and/or retraining includes self-tuning (or autonomous tuning), self-learning (or autonomous learning), and/or self-retraining (or autonomous retraining). The term "machine learning lifecycle" or "ML lifecycle" at least in some examples refers to process(es) of planning and/or managing the development, deployment, instantiation, and/or termination of an ML model and/or individual ML model components.

The term "matrix" at least in some examples refers to a rectangular array of numbers, symbols, or expressions, arranged in rows and columns, which may be used to represent an object or a property of such an object.

The terms "model parameter" and/or "parameter" in the context of ML, at least in some examples refer to values, characteristics, and/or properties that are learnt during training. Additionally or alternatively, "model parameter" and/or "parameter" in the context of ML, at least in some examples refer to a configuration variable that is internal to the model and whose value can be estimated from the given data. Model parameters are usually required by a model when making predictions, and their values define the skill of the model on a particular problem. Examples of such model parameters/parameters include weights (e.g., in an ANN); constraints; support vectors in a support vector machine (SVM); coefficients in a linear regression and/or logistic regression; word frequency, sentence length, noun or verb distribution per sentence, the number of specific character n-grams per word, lexical diversity, and the like, for natural language processing (NLP) and/or natural language understanding (NLU); and/or the like.

The terms "regression algorithm" and/or "regression analysis" in the context of ML at least in some examples refers to a set of statistical processes for estimating the relationships between a dependent variable (often referred to as the "outcome variable") and one or more independent variables (often referred to as "predictors", "covariates", or "features"). Examples of regression algorithms/models include logistic regression, linear regression, gradient descent (GD), stochastic GD (SGD), and the like.

The term "reinforcement learning" or "RL" at least in some examples refers to a goal-oriented learning technique based on interaction with an environment. In RL, an agent aims to optimize a long-term objective by interacting with the environment based on a trial and error process. Examples of RL algorithms include Markov decision process, Markov chain, Q-learning, multi-armed bandit learning, temporal difference learning, and deep $RL_c$ The term "multi-armed bandit problem", "K-armed bandit problem", "N-armed bandit problem", or "contextual bandit" at least in some examples refers to a problem in which a fixed limited set of resources must be allocated between competing (alternative) choices in a way that maximizes their expected gain, when each choice's properties are only partially known at the time of allocation, and may become better understood as time passes or by allocating resources to the choice. The term "contextual multi-armed bandit problem" or "contextual bandit" at least in some examples refers to a version of multi-armed bandit where, in each iteration, an agent has to choose between arms; before making the choice, the agent sees a d-dimensional feature vector (context vector) associated with a current iteration, the learner uses these context vectors along with the rewards of the arms played in the past to make the choice of the arm to play in the current iteration, and over time the learner's aim is to collect enough information about how the context vectors and rewards relate to each other, so that it can predict the next best arm to play by looking at the feature vectors.

The term "reward function", in the context of RL, at least in some examples refers to a function that outputs a reward value based on one or more reward variables; the reward value provides feedback for an RL policy so that an RL agent can learn a desirable behavior. The term "reward shaping", in the context of RL, at least in some examples refers to adjusting or altering a reward function to output a positive reward for desirable behavior and a negative reward for undesirable behavior.

The term "supervised learning" at least in some examples refers to an ML technique that aims to learn a function or generate an ML model that produces an output given a labeled data set. Supervised learning algorithms build models from a set of data that contains both the inputs and the desired outputs. For example, supervised learning involves learning a function or model that maps an input to an output based on example input-output pairs or some other form of labeled training data including a set of training examples. Each input-output pair includes an input object (e.g., a vector) and a desired output object or value (referred to as a "supervisory signal"). Supervised learning can be grouped into classification algorithms, regression algorithms, and instance-based algorithms.

term "tensor" at least in some examples refers to an object or other data structure represented by an array of components that describe functions relevant to coordinates of a space. Additionally or alternatively, the term "tensor" at least in some examples refers to a generalization of vectors and matrices and/or may be understood to be a multidimensional array. Additionally or alternatively, the term "tensor" at least in some examples refers to an array of numbers arranged on a regular grid with a variable number of axes. At least in some examples, a tensor can be defined as a single point, a collection of isolated points, or a continuum of points in which elements of the tensor are functions of position, and the Tensor forms a "tensor field". At least in some examples, a vector may be considered as a one dimensional (1D) or first order tensor, and a matrix may be considered as a two dimensional (2D) or second order tensor. Tensor notation may be the same or similar as matrix notation with a capital letter representing the tensor and lowercase letters with subscript integers representing scalar values within the tensor.

The term "tuning" or "tune" at least in some examples refers to a process of adjusting model parameters or hyperparameters of an ML model in order to improve its performance. Additionally or alternatively, the term "tuning" or "tune" at least in some examples refers to optimizing an ML model's model parameters and/or hyperparameters. In some examples, the particular model parameters and/or hyperparameters that are selected for adjustment, and the optimal values for the model parameters and/or hyperparameters vary depending on various aspects of the ML model, the training data, ML application and/or use cases, and/or other parameters, conditions, or criteria.

The term "unsupervised learning" at least in some examples refers to an ML technique that aims to learn a function to describe a hidden structure from unlabeled data. Unsupervised learning algorithms build models from a set of data that contains only inputs and no desired output labels. Unsupervised learning algorithms are used to find structure in the data, like grouping or clustering of data points. Examples of unsupervised learning are K-means clustering, principal component analysis (PCA), and topic modeling, among many others. The term "semi-supervised learning" at least in some examples refers to ML algorithms that develop ML models from incomplete training data, where a portion of the sample input does not include labels.

What is claimed is:

1. A method for language model prompt engineering, the method comprising:

providing, by at least one first processor, to a large language model (LLM), a first meta-prompt comprising a first task and instructing the LLM to generate a set of task-specific reasoning modules;

generating, by the LLM, the set of task-specific reasoning modules based on the first meta-prompt;

providing, by at least one second processor, to the LLM, a second meta-prompt comprising the first task, a second task providing an example format in which to generate an initial reasoning structure, and at least a first reasoning module of the task-specific reasoning modules, wherein the second meta-prompt instructs the LLM to generate the initial reasoning structure in the example format and defining how to respond to the first task without providing a response;

generating, by the LLM, the initial reasoning structure based on the second meta-prompt;

providing, by at least one third processor, to the LLM, a third meta-prompt comprising the first task, the set of task-specific reasoning modules, and the initial reasoning structure, wherein the third meta-prompt instructs the LLM to iteratively refine the initial reasoning structure based on the first task; and generating, by the LLM, a refined reasoning structure based on the third meta-prompt, wherein the refined reasoning structure provides a reasoning plan defining how to generate the response to at least the first task without providing the response.

2. The method of claim 1, further comprising:

providing, to the LLM, the refined reasoning structure; and generating, by the LLM, the response to the first task based on the refined reasoning structure.

3. The method of claim 1, wherein the refined reasoning structure further defines how to respond to a third task.

4. The method of claim 1, wherein the set of task-specific reasoning modules are not provided to the LLM as a pre-set list of reasoning modules.

5. A method for machine learning model prompt engineering, the method comprising:

providing, by at least one first processor, to a machine learning model, a first prompt comprising a first task and instructing the machine learning model to generate a set of task-specific reasoning modules;

generating, by the machine learning model, the set of task-specific reasoning modules based on the first prompt, the set of task-specific reasoning modules comprising a first reasoning module;

and generating, by the machine learning model, based on the first task, a second task providing an example format in which to generate an initial reasoning structure, and at least the first reasoning module, the initial reasoning structure in the example format, wherein the initial reasoning structure defines how to respond to at least the first task without providing a response.

6. The method of claim 5, wherein the machine learning model is a large language model (LLM).

7. The method of claim 5, further comprising:

providing, by at least one third processor, to the machine learning model, a second prompt comprising the first task, the set of task-specific reasoning modules, and the initial reasoning structure, wherein the second prompt instructs the machine learning model to iteratively refine the initial reasoning structure based on the first task; and generating, by the machine learning model, a refined reasoning structure based on the second prompt, wherein the refined reasoning structure provides a reasoning plan defining how to generate the response to the first task without providing the response.

8. The method of claim 7, further comprising:

providing, to the machine learning model, the refined reasoning structure; and generating, by the machine learning model, the response to the first task based on the refined reasoning structure.

9. The method of claim 5, wherein the set of task-specific reasoning modules are not provided to the machine learning model as a pre-set list of reasoning modules.

10. The method of claim 5, wherein the machine learning model is selected via a user interface of a cloud-based service, and wherein the cloud-based service automatically generates the first prompt.

11. The method of claim 10, further comprising:

receiving, via the cloud-based service, a user selection of the first task;

receiving, via the cloud-based service, a user request to automatically generate a second prompt for the machine learning model; and generating, via the cloud-based service, the second prompt based on the user request, wherein the second prompt comprises a refined reasoning structure that provides a reasoning plan defining how to generate the response to the first task without providing the response.

12. The method of claim 11, further comprising:

receiving, via the cloud-based service, at least one of sample data on which to test prompting of the machine learning model, or few-shot examples, wherein the third prompt is further based on the at least one of the sample data or the few-shot examples.

13. The method of claim 5, wherein the machine learning model is selected via a command line interface, and wherein the command line interface automatically generates the first prompt.

14. The method of claim 5, wherein generating the initial reasoning structure is further based on at least one additional reasoning module of the set of task-specific reasoning modules.

15. A system for machine learning model prompt engineering, the system comprising:

first memory coupled to at least one first processor configured to:

provide, to a machine learning model, a first prompt comprising a first task and instructing the machine learning model to generate a set of task-specific reasoning modules;

the machine learning model, wherein the machine learning model is configured to:

generate the set of task-specific reasoning modules based on the first prompt, the set of task-specific reasoning modules comprising a first reasoning module;

generate an initial reasoning structure based on the first task, a second task providing an example format in which to generate an initial reasoning structure, and at least the first reasoning module, the initial reasoning structure in the example format, wherein the initial reasoning structure defines how to respond to at least the first task without providing a response.

16. The system of claim 15, further comprising second memory coupled to at least one second processor configured to:

provide, to the machine learning model, a second prompt comprising the first task, the set of task-specific reasoning modules, and the initial reasoning structure, wherein the second prompt instructs the machine learning model to iteratively refine the initial reasoning structure based on the first task, wherein the machine learning model is further configured to:

generate a refined reasoning structure based on the second prompt, wherein the refined reasoning structure provides a reasoning plan defining how to generate the response to the first task without providing the response.

17. The system of claim 16, wherein the first prompt comprises the second prompt.

18. The system of claim 16, wherein the language model is further configured to generate the response to the first task based on the refined reasoning structure.

19. The system of claim 15, wherein the set of task-specific reasoning modules are not provided to the machine learning model as a pre-set list of reasoning modules.

20. The system of claim 15, further comprising a cloud-based service, wherein the language model is selected via a user interface of the cloud-based service, and wherein the cloud-based service automatically generates the first prompt and the second prompt.

* * * * *